United States Patent
McNally

(10) Patent No.: US 8,562,333 B2
(45) Date of Patent: Oct. 22, 2013

(54) ROTATIONAL MOLDING MACHINE AND METHOD

(75) Inventor: Douglas John McNally, Chatham (CA)

(73) Assignee: Konal Engineering and Equipment Inc., Blenheim, Ontario (CA)

(*) Notice: Subject to any disclaimer, the term of this patent is extended or adjusted under 35 U.S.C. 154(b) by 446 days.

(21) Appl. No.: 13/017,723

(22) Filed: Jan. 31, 2011

(65) Prior Publication Data

US 2012/0195995 A1   Aug. 2, 2012

(51) Int. Cl.
*B28B 21/00*   (2006.01)

(52) U.S. Cl.
USPC .............. 425/435; 425/DIG. 246; 264/302; 264/DIG. 60

(58) Field of Classification Search
USPC .............. 425/256, 435, DIG. 110, DIG. 246; 264/302, 303, DIG. 60
See application file for complete search history.

(56) References Cited

U.S. PATENT DOCUMENTS

| | | | | |
|---|---|---|---|---|
| 5,106,285 A * | 4/1992 | Preston | | 425/435 |
| 5,221,539 A * | 6/1993 | Pallerberg et al. | | 425/429 |
| 6,019,590 A * | 2/2000 | McNally | | 425/435 |
| 6,648,625 B2 * | 11/2003 | Bauer | | 425/429 |
| 6,673,288 B2 * | 1/2004 | Dargavell et al. | | 425/435 |

* cited by examiner

*Primary Examiner* — Richard Crispino
*Assistant Examiner* — Thukhanh Nguyen

(57) ABSTRACT

A molding machine apparatus and method for the production of thermoplastic skins or shells by means of what is generally known as rotational or slush molding. The tooling is heated uniformly, rapidly and efficiently by means of high velocity, hot air streams directed at the tooling which create turbulent flow on the surface of the tooling. The air stream is accelerated by means of adjustable nozzles and the air is circulated in the mold by means of a centrifugal fan.

10 Claims, 3 Drawing Sheets

FIGURE 3a
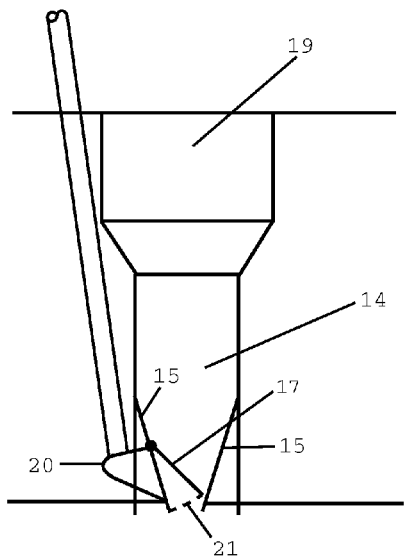
FIGURE 4a
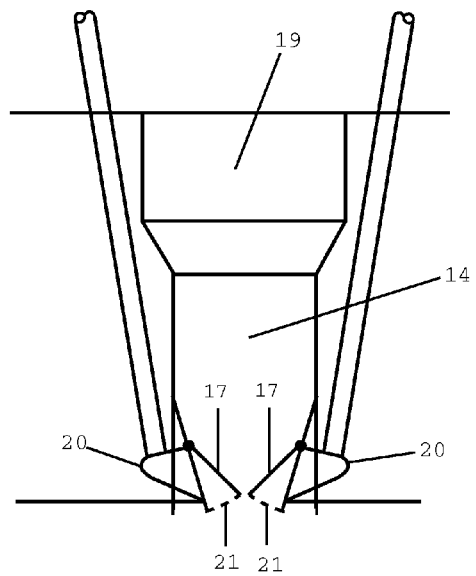
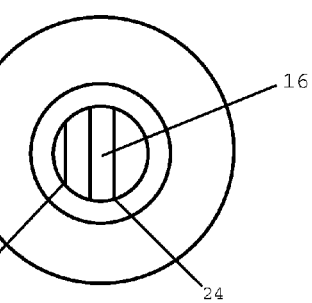
FIGURE 3b
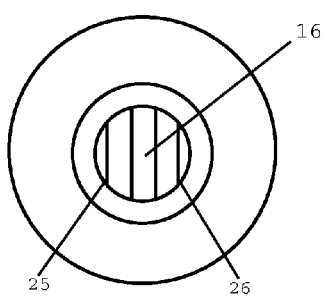
FIGURE 4b

ROTATIONAL MOLDING MACHINE AND METHOD

BACKGROUND OF THE INVENTION

The invention relates to a molding machine apparatus and method for the production of thermoplastic skins or shells by means of what is generally known as rotational or slush molding. One example of a prior art apparatus is described in my issued U.S. Pat. No. 6,461,561.

A continuing operational challenge and technical objective for this type of molding is to quickly heat the mold to a uniform temperature. This is because the surface area of the tooling is irregular. It is an object of this invention to heat the mold tooling uniformly, rapidly and efficiently to thereby minimize cycle time for production of parts.

According to the present invention, a plurality of high velocity streams of heated air are directed at the irregularly shaped tooling in order to heat the mold to the operating temperature. In particular, an array of combustion conduits are arranged around the tooling which each direct the heated air at different parts of the tooling to thereby bring the tooling to operating temperature.

It has been found that heat is most efficiently transferred to the tooling when the air flow over the surface thereof is turbulent. Turbulent flow occurs at high Reynolds numbers and is dominated by inertial forces, which tend to produce chaotic eddies, vortices and other flow instabilities. When flow is turbulent, air exhibits additional transverse motion which enhances the rate of energy and momentum exchange thus increasing the heat transfer and the friction coefficient.

As the velocity of the air over the surface of the tooling increases beyond the point of establishing turbulent flow, the amount of heat or energy transferred does not increase proportionally. Because increased turbulent flow does not proportionately heat the tooling surface to a higher temperature, all surfaces of the tooling experiencing turbulent flow will tend to a uniform temperature.

Because the tooling has an irregular shaped surface, some surface areas of the tooling will experience turbulent flow before other surfaces and these surfaces will heat more rapidly than those not subject to turbulent flow. It is accordingly an object of the invention to be able to control, adjust and vary the molding machine operating parameters to achieve turbulent air flow over the entire surface of the irregular shaped tooling. As such, the molding machine elements and operating parameters should preferably be adjustable. In order to make good parts, the operator must be able to control and change these parameters as required.

SUMMARY OF THE INVENTION

It is an object of the present invention to provide a mold apparatus and method for the production of thermoplastic skins or shells by means of what is generally known as rotational or slush moulding.

It is an object of the present invention to provide a mold apparatus having an oven chamber, a low pressure return chamber, a high pressure chamber and a plurality of gas burners and means to rotate said apparatus. The oven chamber is fluidly connected to the low pressure return chamber by means of a plurality of ports and dampers. The low pressure chamber is fluidly connected to the high pressure chamber by means of a fan operable to pressurize the air in the high pressure chamber and to circulate the air between the chambers. The high pressure chamber is fluidly connected to the oven chamber by means of a plurality of combustion conduits each having an intake section and exhaust nozzle section. Each gas burner is aligned with one of the combustion conduits. The burners are operable to heat the air in the intake sections of the combustion conduits and each nozzle accelerates and directs a high velocity hot air stream into the oven chamber to heat the tooling in the oven chamber.

It is another object of this invention to heat the mold tooling uniformly, rapidly and efficiently to thereby minimize cycle time for production of parts.

It is a further object of the invention to provide an adjustable nozzle section in the combustion conduit to vary the size of the outlet and velocity of the air stream.

Finally, it is an object of the present invention to provide a rotational molding machine having computer controlled adjustable nozzle sections and dampers.

DESCRIPTION OF DRAWINGS

In order that the invention may be more clearly understood, a preferred embodiment thereof will now be described in detail by way of example, with reference to the accompanying drawings, in which:

FIG. 3a is a sectional schematic view of a combustion conduit consisting of an intake section and exhaust nozzle section arrangement having one adjustable trim tab according to this invention.

FIG. 3b is a bottom view of a combustion conduit showing the range of movement of the trim tab and size of nozzle opening.

FIG. 4a is a sectional schematic view of a combustion conduit consisting of an intake section and exhaust nozzle section arrangement having two adjustable trim tabs according to the invention.

FIG. 4b is a bottom view of a combustion conduit showing the range of movement of the trim tabs and size of nozzle opening.

BRIEF DESCRIPTION OF THE PREFERRED EMBODIMENTS

Figure 1:
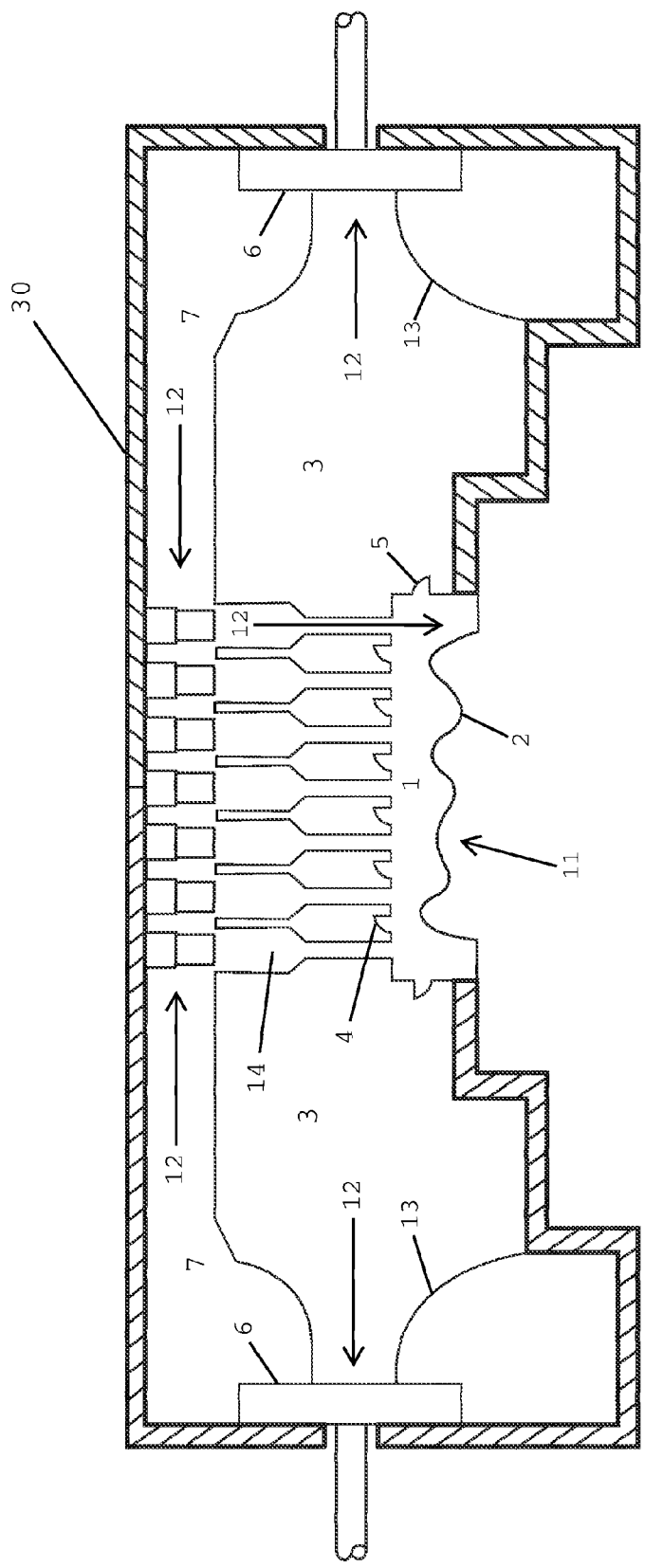
FIG. 1 is a sectional schematic side view of the interior of the molding machine apparatus according to this invention taken along the longitudinal axis.

In general terms, the molding machine 30 according to a preferred embodiment of this invention comprises an insulated drum like structure which is adapted to rotate along its longitudinal axis. The purpose and function of the machine is to heat and rotate the tooling in the presence of resin as is understood in the art. The tooling is heated by means of directing a high velocity hot air stream at the tooling. The resin fuses to the tooling during rotation to make a thermoplastic skin part.

The interior of the machine is divided into three fluidly connected chambers through which the air circulates. First, a heating or oven chamber 1 is provided which houses the tooling 2. Second, a low pressure or return chamber 3 is provided which is fluidly connected to the oven chamber by means of ports 4 (total of six shown) or dampers 5 (total of two shown) or a combination thereof. The heated air in the oven is exhausted into the return chamber through the ports and dampers and is recirculated. Third, a concentric high pressure chamber 7 is provided which is fluidly connected to the return chamber by means of a centrifugal fan 6 at each end of the machine. The centrifugal fan moves and pressurizes the circulating air from the return chamber into the high pressure chamber by accelerating the air radially outwardly.

Figure 2:
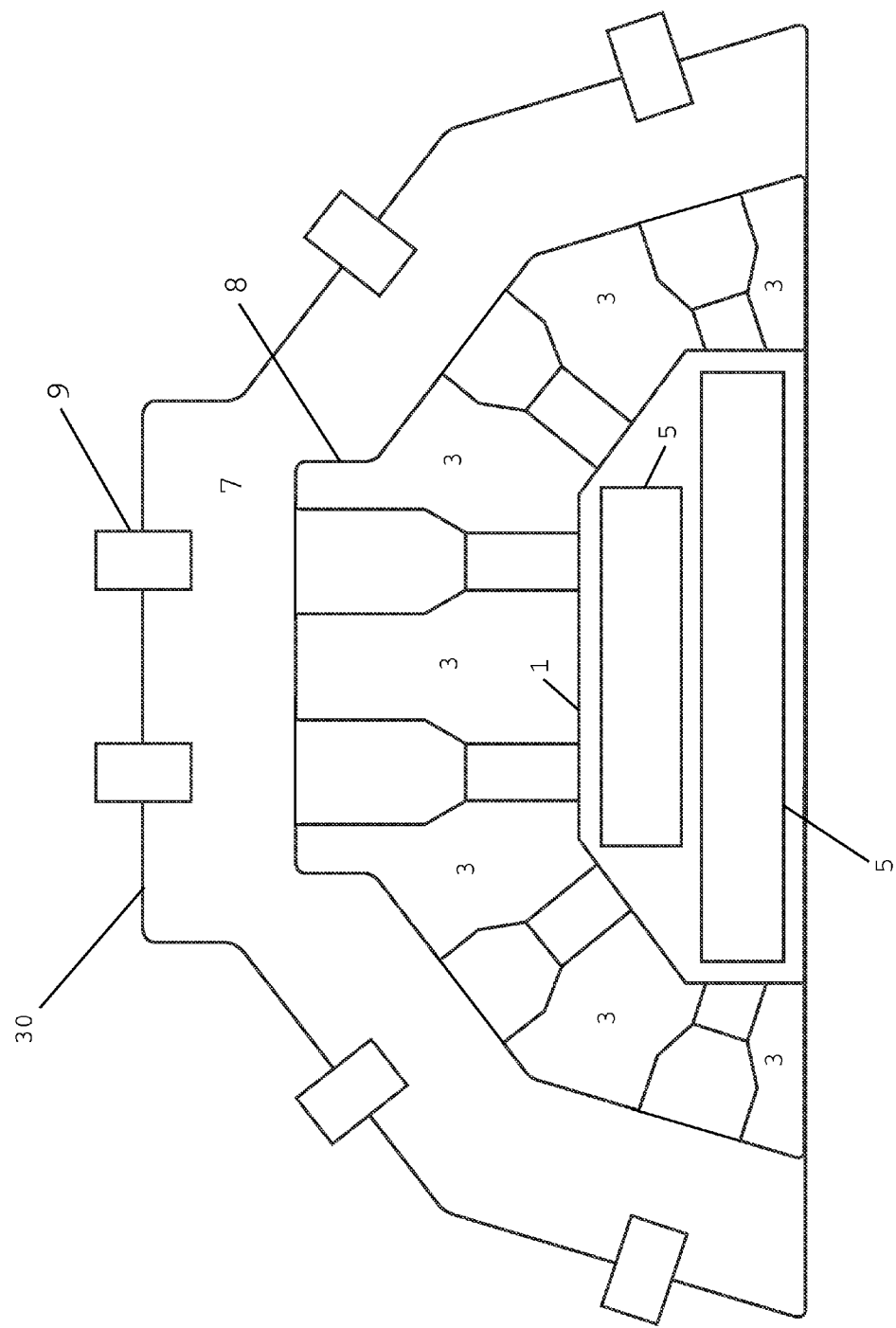
FIG. 2 is a sectional schematic cross sectional view of the interior of the molding machine according to this invention.

Referring to FIG. 2, the high pressure chamber 7 is fluidly connected to the oven by an array of combustion conduits 8 (total of six shown) each aligned with a gas burner 9 (total of seven shown) installed around the periphery of the outside frame of the molding machine 30. The high pressure air enters the combustion conduit and is heated by the burner. The combustion conduits are adapted with exhaust nozzles 10 shown in FIGS. 3a and 3b which accelerate and direct a stream of hot air the tooling at high velocity.

Tool access to the oven chamber is provided at the front of the machine by means of a rectangular door opening 11. The tooling is mounted on a rectangular frame (not shown) which is releasably attached to the door opening thereby closing the oven for the heating cycle.

The air heating cycle is initiated to heat the tooling and charge it with resin to make a part. This is normally accomplished by moving a rectangular like resin containing box (now shown) underneath the molding machine which is rotated downwardly into alignment with the resin box. The resin box is then raised and releasably attached to the tooling frame. Rotation of the molding machine on its longitudinal axis brings the resin into contact with the tooling at proper temperature to form the part. The rectangular dimensions of the door, the tooling frame and resin box are all dimensioned to fit and complement one another. Conventional means are provided to releasably connect the various described elements by any suitable means well-known in the art. It is further noted that the tooling itself can consist of multiples of two or four tools which enables two or four parts to be made during a single molding cycle.

Referring to FIG. 1, a preferred embodiment of the molding machine is schematically shown. The heating cycle will now be described. The air flow in the molding machine is indicated by arrows 12. Air in the high pressure chamber enters the combustion conduits where it is heated and directed onto the tooling to heat it to operating temperature. The oven air is then exhausted into the return chamber by means of a plurality of ports or openings 4 and dampers 5 arranged around the periphery of the oven chamber walls between the combustion conduits and at each end of the oven. The dampers 5 provide additional control of the machine operating parameters being adapted with movable plates which are operable to regulate the flow of air between the chambers.

The centrifugal fan 6 collects the air from the low pressure chamber and delivers pressurized air to the high pressure chamber. Additionally, each fan is adapted with a volute 13 at each intake to increase the efficiency of the fan.

The air in the combustion conduits is heated by means of gas burners which are axially aligned with the combustion conduits and mounted on the exterior frame of the molding machine. Referring to FIG. 2 an array of combustion conduits is arranged in semi hemispherical fashion around the periphery of the oven. In the embodiment shown the cross sectional shape of the oven chamber 1 is hexagonal-like and the combustion conduits are arranged at more or less regular intervals around the periphery thereof.

Referring to FIG. 3, the combustion conduit consists of an intake section 19 and a nozzle section 14 which accelerates and directs the air flow at the tooling in the form of a high velocity air stream.

Each nozzle section conduit consists of two opposing flat plates 15 which converge downwardly to narrow the exhaust opening. The opposing plates are tapered at their upper ends to fit the circular cross section of the combustion chamber. At the bottom of the nozzle section the plates converge and form a rectangular like outlet opening 16. The nozzles are made adjustable by adapting the trailing end of one or both of the plates with adjustable trim tabs 17 which are operable to control the size and direction of the high velocity air stream.

In FIG. 3b the range of movement is between 23 and 24 while in FIG. 4b the range is between 25 and 26. A linkage mechanism schematically shown at 20 is operable to pivot the trim tab 17 inwardly and outwardly to vary the size of the outlet. Referring to FIG. 4b, a trim tab is provided on each side of the nozzle. As such the nozzle is also able to direct the air stream left or right by opening one side and closing the other. Referring to FIGS. 3a and 3b, the range of travel of the trim tabs is schematically illustrated with dotted lines 21.

It is to be noted that the molding machine need not be stationery during the heating cycle and may in fact be rotating as for example, when the resin box is attached to the molding machine. Adjustability of the dampers and nozzle trim tabs is provided by computer linkages and rods 20 as is known in the art. The linkages are typically connected to air cylinders which are connected to pneumatic valves which are controlled by a computer.

It is further noted that the use of the terms high pressure and low pressure when describing the chambers is a relative use of the term meaning that air normally flows from a high pressure region to a low pressure region and is thereby circulated in the molding machine. The operating parameters of the molding machine are adjustable as described having regard as well to the following example of a specification for a molding apparatus according to this invention.

Example

1. Combustion Conduits: An array of six rows around the periphery of the oven each row having seven combustion conduits as schematically illustrated in FIGS. 1 and 2. A total of 42 conduits and burners.
2. Centrifugal fan: New York Blower Fan—Balanced for 1770 Rpm safe speed @ 800F Rated 65,000 CFM
3. Fan Motor: 250 HP, 1800 RPM
4. Gas burner: North American—Rated 192,000 Btu/HR Further advantages which are inherent to the molding method and apparatus are obvious to one skilled in the art. The embodiments are described herein illustratively and are not meant to limit the scope of the invention as claimed. Variations to the foregoing embodiments will be evident to a person of ordinary skill and are intended by the inventor to be encompassed by the following claims.

What is claimed:

1. Mold apparatus comprising an oven chamber, a low pressure return chamber, a high pressure chamber, a plurality of gas burners and means to rotate said apparatus wherein the oven chamber is fluidly connected to the low pressure return chamber by means of a plurality of ports and is adapted to receive tooling; and wherein the low pressure chamber is fluidly connected to the high pressure chamber by fan means operable to pressurize the air in the high pressure chamber and to circulate the air in the mold apparatus between the chambers; and wherein the high pressure chamber is fluidly connected to the oven chamber by means of a plurality of combustion conduits each having an intake section and exhaust nozzle section and wherein each said gas burner is aligned with one of said combustion conduits; and wherein said burners are operable to heat the air in the intake sections of the combustion conduits and wherein each said nozzle section accelerates and directs a high velocity hot air stream into the oven chamber to the heat tooling in the oven chamber.

2. The invention as claimed in claim 1 wherein said fluid connection between the oven chamber and return chamber includes one or more dampers that are adjustable to vary the size of the damper opening.

3. The invention as claimed in claim 2 wherein said fan means is a centrifugal fan located on each side of the low pressure return chamber.

4. The invention as claimed in claim 3 wherein said exhaust nozzle section consists of two opposed downwardly conveying plates defining at outlet opening.

5. The invention as claimed in claim 4 wherein one or both of said plates has a trailing trim tab portion which is pivotally adjustable to vary the size outlet opening.

6. The invention as claimed in claim 5 wherein the flow of the air stream over the tooling is turbulent.

7. The invention as claimed in claim 6 wherein each fan is adapted with a volute at its inlet.

8. The invention as claimed in claim 7 wherein the molding machine is insulated.

9. The invention as claimed in claim 8 wherein the tooling is irregularly shaped.

10. The invention as claimed in claim 9 wherein the tooling includes multiple tooling.

\* \* \* \* \*